United States Patent [19]

Harrington

[11] Patent Number: 4,970,350

[45] Date of Patent: Nov. 13, 1990

[54] CABLE CONNECTOR

[76] Inventor: Robert W. Harrington, 5363 Wildwood Crescent, British Columbia, Delta, Canada, V4M 3S8

[21] Appl. No.: 344,712

[22] Filed: Apr. 28, 1989

[30] Foreign Application Priority Data

Apr. 29, 1988 [CA] Canada .................................. 565628

[51] Int. Cl.$^5$ .............................................. H02G 3/22
[52] U.S. Cl. ............................ 174/65 G; 174/153 G; 248/56; 285/162
[58] Field of Search ................... 174/64, 65 R, 65 G, 174/135, 152 G, 153 G; 16/108; 248/56; 285/158, 159, 162, 192, 194; 439/449, 461, 470

[56] References Cited

U.S. PATENT DOCUMENTS

| 799,989 | 9/1905 | Klein | 285/194 X |
|---|---|---|---|
| 2,420,826 | 5/1947 | Irrgang | 439/449 X |
| 2,457,235 | 12/1948 | Hoehn | 174/65 R X |
| 2,466,504 | 4/1949 | Stoyer | 285/162 |
| 2,564,341 | 8/1951 | Paige | 285/162 |
| 2,577,748 | 12/1951 | Gillespie | 285/162 |
| 2,744,769 | 5/1956 | Roeder et al. | 248/56 X |
| 3,288,407 | 11/1966 | Downer et al. | 248/56 |
| 4,056,252 | 11/1977 | Simon | 439/449 X |
| 4,350,839 | 9/1982 | Lass | 174/153 G X |

*Primary Examiner*—Laramie E. Askin
*Attorney, Agent, or Firm*—Shlesinger & Myers

[57] ABSTRACT

A cable connector for insulated electrical wire cable comprises a housing having first and second open ends and an inner wall forming a channel extending through the housing for longitudinally receiving the cable. A coupling means is mounted within the housing for urging the cable towards the inner wall and includes a flange, means for grippingly engaging the cable between the inner wall and the flange, and an elongated bracing pin for providing resistance to the bending of the flange.

11 Claims, 1 Drawing Sheet

U.S. Patent     Nov. 13, 1990     4,970,350
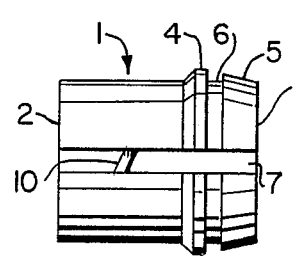
FIG. 1
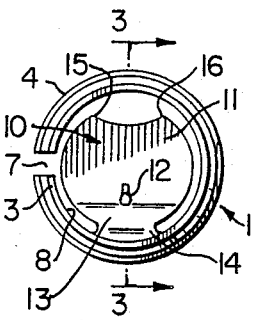
FIG. 2
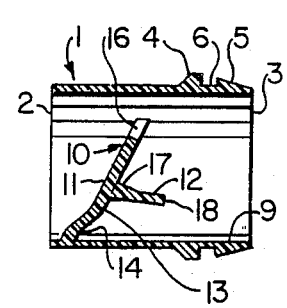
FIG. 3
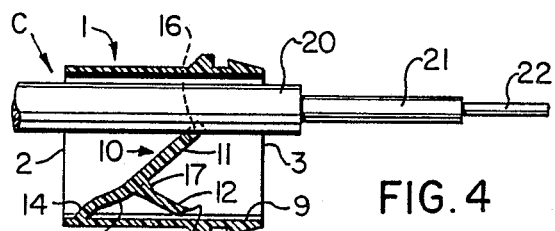
FIG. 4
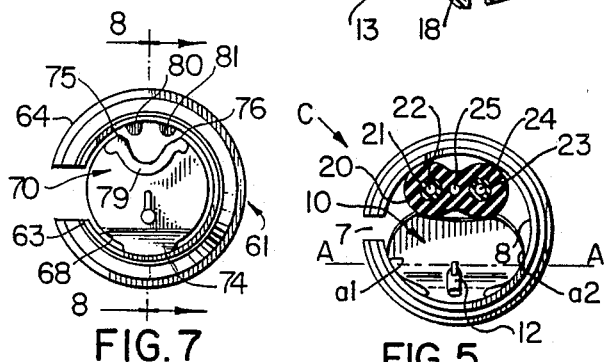
FIG. 7     FIG. 5
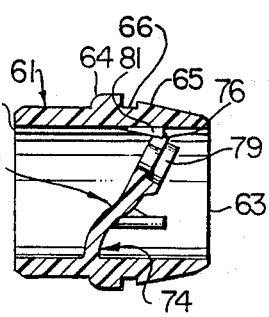
FIG. 8
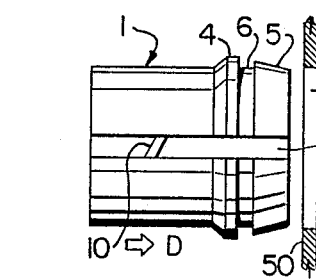
FIG. 6a
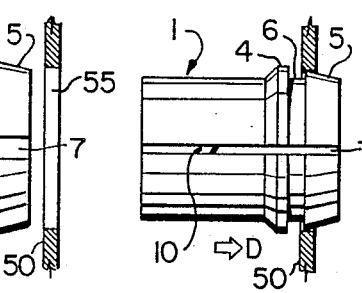
FIG. 6b
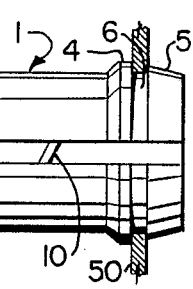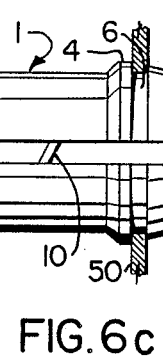
FIG. 6c

CABLE CONNECTOR

FIELD OF THE INVENTION

This invention relates to cable connectors for insulated electrical wire cable, and in particular to cable connectors that include means for holding or clamping against movement of the cable.

BACKGROUND TO THE INVENTION

In the wiring of various electrical devices, there is often a requirement to extend an insulated electrical wire cable from one side of a wall to electrical terminal connections situated on the other side. When the terminal connections are made, it is frequently desirable to clamp, connect or otherwise hold the cable in advance of the terminal connections so that any pulling forces on the cable are absorbed at the clamp and not at the terminals where wires may loosen and cause a short circuit or loss of power. Cable connectors which perform this function are known. However, they typically comprise several pieces, including tightening screws or the like, and can be relatively awkward to install and use, especially in confined working spaces.

SUMMARY OF THE INVENTION

In accordance with a broad aspect of the present invention, there is provided a cable connector for insulated electrical wire cable which comprises a housing having first and second open ends and an inner wall which forms a channel extending through the housing between such ends for longitudinally receiving the cable. Coupling means mounted within the housing is designed to urge the cable towards the inner wall of the channel. Such coupling means is resiliently bendable to permit sliding passage of the cable between the inner wall and the coupling means when the cable is inserted and moved through the channel in a direction leading from the first end of the channel to said second end of the channel. Further, the coupling means includes gripping means for grippingly engaging the cable between the inner wall and the coupling means when an attempt is made to withdraw the cable from the channel in the opposite direction.

In a preferred embodiment of the invention, the coupling means comprises a resiliently bendable flange having a lower portion mounted to the inner wall of the housing and an upper portion extending upwardly therefrom at an angle leaning forwardly in the channel in the direction of said second end. Such a flange may be provided with a pair of uppermost cable engaging tips to provide the gripping engagement described above.

Advantageously, a cable connector in accordance with the present invention may be designed such that opposed side edges of the flange move into contact abutment with the inner wall of the housing when the flange is forcibly bent forwardly more than a predetermined degree. At this point, additional resistance against further bending will be encountered, thereby providing tighter gripping engagement of the cable a feature that can be desirable when relatively large cable is passed through the connector. Additional resistance to further bending may also be provided by a bracing pin mounted to the flange and which acts in a bracing manner to resist further bending if the flange is forcibly bent forwardly more than a predetermined degree.

As will become apparent, a cable connector in accordance with the present invention can be a unitary one-piece construction, integrally formed from a resilient plastic material.

In a preferred embodiment, the present invention has an elongated cylindrical configuration with an elongated slot extending lengthwise of the housing and through the wall of the housing to permit resilient radial compression of the housing. As will be seen, such a provision can facilitate insertion of the cable connector through a hole in a wall, followed by snapping engagement of the housing with the wall.

BRIEF DESCRIPTION OF THE DRAWINGS

The foregoing and other features and advantages of the present invention will now be described with reference to the drawings in which:

FIG. 1 is a side elevation view of a cable connector in accordance with the present invention.

FIG. 2 is an end elevation view of the cable connector shown in FIG. 1.

FIG. 3 is a sectional view taken along line 3—3 in FIG. 2.

FIG. 4 is a sectional side view of the cable connector of FIG. 1 showing an insulated electrical wire cable inserted through the connector.

FIG. 5 is an end elevation view of the cable connector of FIG. 1 showing a cable inserted through the connector as in FIG. 4.

FIG. 6 consisting of FIGS. 6(a), (b) and (c), shows the cable connector of FIG. 1 progressing through a hole in a wall and then engaging with the wall.

FIG. 7 is an end elevation view of an alternate embodiment of the present invention.

FIG. 8 is a sectional view taken along line 8—8 in FIG. 7.

DETAILED DESCRIPTION

Referring now to the FIGS. 1, 2 and 3, there is shown a cable connector comprising a housing generally designated 1 and a flange or coupling means generally designated 10 mounted within the housing. Housing 1 and flange 10 are integrally formed from resilient plastic material which permits resilient radial compression of the housing and, as well, resilient bending of the flange, both of which features are discussed below in more detail. Various plastic materials may be used, and will preferably be both heat resistant and electrically non-conductive. The connector shown in the Figures has been fabricated from General Electric NORYL TM PX 4191-780, No. 8463 thermoplastic resin.

Housing 10 has a cylindrical cross-section and includes an inner wall 8 which forms a cylindrical channel extending through the housing between open ends 2 and 3. Lower portion 14 of flange 10 is mounted to inner wall 8 (by means of integral formation). Mid and upper portions of flange 10 (designated 13 and 11, respectively) extend upwardly from lower portion 14 at an angle leaning forwardly in the channel in the direction of end 3. The base end 17 of an elongated bracing pin 12 is mounted to flange 10 (by means of integral formation) and extends to a free end 18. The purpose of bracing pin 12 is described below.

The position of flange 10 as shown in FIGS. 2 and 3 is the natural position assumed by the flange in the absence of any externally applied forces.

FIGS. 4 and 5 show the cable connector of FIGS. 1, 2 and 3 following insertion of an insulated electrical wire cable generally designated "C". Cable C (which does not form part of the invention) comprises electrical conducting wires 22, 23 and 25, all surrounded and separated by an outer layer of insulation 20. As well, conducting wires 22 and 23 each include individual electrical insulation layers 21 and 24, respectively. Conducting wire 25 is a ground wire and as such has no individual layer of insulation. Cable such as that depicted in FIGS. 4 and 5 is typical of that which may be found in many homes.

By the insertion of cable C as shown in FIGS. 4 and 5 (the direction of insertion being from end 2 to end 3 or left to right in FIG. 4), and the resulting force on flange 10, flange 10 has been resiliently bent forwardly from the position shown in FIGS. 2 and 3. As can best be seen in FIG. 5, flange 10 holds cable C between a pair of uppermost cable engaging tips 15, 16 and inner wall 8 urging the cable against inner wall 8.

So long as cable C is pushed, drawn or otherwise moved from left to right in FIG. 4, comparatively little resistance is encountered. While flange 10 engages cable C at all times, it bends forwardly to the degree necessary to permit sliding passage in the left to right direction. Primarily, the resistance will be a sliding resistance, the amount of which will depend upon the resiliency of flange 10 and the overall size of cable C. (Of course, there are limits. For a given size of cable connector, there will obviously be cables that are too large. Likewise, there will be cables that are too small.)

In contrast, flange 10 will offer considerable resistance to movement of cable C from right to left in FIG. 4. If an attempt to move cable C in this direction is made, then cable engaging tips 15 and 16 of flange 10 will dig into and grippingly engage insultion layer 20 of the cable. The effect is to bind cable C between flange 10 and inner wall 8—and the binding force strengthens with increasing effort to move the cable.

As best seen with reference to FIGS. 2 and 5, upper portion 11 of flange 10 has a circular configuration which leads to contact abutment between side edges of the flange (at points a1, a2 in FIG. 5) and inner wall 8 when the flange is bent forwardly a sufficient degree. Before such contact occurs, bending forces at the top of flange 10 have a relatively long moment arm measured to the bottom of flange 10. When such contact occurs, the moment arm becomes foreshortened (viz. measured to axis A—A above the bottom of flange 10 in FIG. 5). As a result, there is an increase in resistance to further bending of the flange and tigther gripping engagement of the cable.

Bracing pin 12 will be served to provide additional resistance to bending of flange 10 if the flange is bent past the position shown in FIGS. 4 and 5. In FIGS. 4 and 5, free end 18 rests slightly above bottom line 9 of inner wall 8. However, if cable C was larger, flange 10 would bend forwardly to a higher degree and eventually to the point where free end 18 would brace against inner wall 8. In effect, the moment arm described above becomes even more foreshortened.

While the provision of design features that provide additional resistance to bending of flange 10 is considered advantageous, it should be understood that the flange can provide a useful grip on cable without bending so far as to move into contact abutment with inner wall 8 (or further where the action of bracing pin 12 comes into play). Also, with limited reconfiguration, it will be appreciated that the flange and bracing pin could be arranged such that the action of the bracing pin would come into play before abutment between the flange and inner wall 8.

As illustrated by FIG. 6, housing 1 is designed to be snappingly engaged with a partition or wall 50 (not forming part of the invention) through which insulated electrical wire cable is to be extended. For this purpose, housing 1 includes a pair of circumferential flanges 4, 5 and a circumferential channel 6 defined therebetween. As well, housing 1 includes an elongated slot 7 that permits resilient radial compression of the housing.

FIG. 6(a) illustrates housing 1 being moved in direction D towards a hole 55 extending through wall 50. Hole 55 is circular having a diameter corresponding to the bottom diameter of channel 6. In FIG. 6(b), housing 1 is continuing to move in direction D. However, as can be seen by the narrowing of slot 7, there has been some limited radial compression of housing 1. The normal maximum diameter of flange 5 exceeds that of hole 55, flange 5 is tapered from a minimum diameter at end 3 of housing 1 to its maximum diameter at the rim of channel 6. FIG. 6(c) illustrates housing 1 fully engaged with wall 50. In this position, flange 5 has moved completely over the perimeter of hole 55 and a snap fit has been achieved between wall 50 and housing 1, the wall being caught in channel 6 between flange 4 on one side and flange 5 on the other. Housing 1 has returned to its normal (radially uncompressed) diameter.

The cable connector of FIGS. 1 to 6 is easy to install and to use. Normally, it can be snapped into a partition, wall, or the like in a single smooth motion. Pushing and drawing a cable through the connector is likewise a simple operation. Then, it becomes a matter of making appropriate electrical terminal connections. For example, conducting wire 22 as shown in FIG. 4 (with insulation layers 20 and 21 stripped away) would be connected to an electrical terminal (not shown in the Figures). The same would be done with conducting wire 23 and ground wire 25. In use, the connector provides a mechanical buffer between pulling forces on the cable. Pulling forces on the cable are absorbed or largely absorbed by the connector and transmitted to the partition or wall rather than the terminal connections.

FIGS. 7 and 8 of the drawings illustrate an alternate embodiment generally designated 61 of the present invention.

In the embodiment of FIGS. 7 and 8, lower portion 74 of flange 70 is more centrally disposed between open ends 62 and 63 than lower portion 14 of flange 10 in the embodiment of FIGS. 1 to 6. As well, it will be observed that coupling flanges 64, 65 and channel 66 are more centrally disposed. Thus there is less lateral distance between lower portion 74 and channel 66 than there is between lower portion 14 and channel 6. It is believed that this feature will reduce twisting or moment forces on the housing when it is engaged with a partition and a cable installed through the connector is pulled upwardly or downwardly in relation to the housing.

The embodiment shown in FIGS. 7 and 8 also embodies certain strengthening and cable securing features. The relatively sharp tips 15 and 16 of flange 10 in housing 1 have been removed in favour of a protruding lip 79 at the top of flange 70 in housing 61. The upper ends 75, 76 of lip 79 are relatively smooth and less susceptible to breakage than tips 15, 16. However, although flange 70 with lip 79 does serve to secure the cable, it is considered by itself to provide a weaker grip than flange 10 with tips 15, 16. This is compensated by providing a pair of lugs 80, 81 which protrude downwardly from inner wall 68 above the top end of flange 70. A cable (not shown), when inserted through the connector, is grippingly engaged from above by lugs 80, 81 and from below by lip 79.

Various modifications and changes to the present invention that fall within the spirit and scope of the following claims are possible and will undoubtedly occur to those skilled in the art.

I claim:

1. A cable connector for insulated electrical wire cable, said connector comprising:
   (a) a housing having first and second open ends and an inner wall forming a channel extending through the housing between said ends for longitudinally receiving an insulated electrical wire cable; and,
   (b) coupling means mounted within said housing for urging said cable towards said inner wall, said coupling means comprising:
      (i) a flange having a lower portion mounted to said inner wall, and an upper portion extending upwardly therefrom at an angle leaning forwardly in said channel in the direction of said second end, said flange being resiliently bendable to permit sliding passage of said cable between said inner wall and said flange when said cable is inserted and moved through said channel in a direction leading from said first end to said second end;
      (ii) gripping means for grippingly engaging said cable between said inner wall and said flange when an attempt is made to withdraw said cable from said channel in the opposite direction; and,
      (iii) an elongated bracing pin for providing bracing resistance to the bending of said flange, said pin extending generally in the direction of said second end of said housing from a base end of said pin mounted to said flange to a free end of said pin.

2. A cable connector as defined in claim 1, wherein said gripping means includes a cable engaging lip formed at the top of said upper portion and a lug protruding downwardly from said inner wall above said lip.

3. A cable connector as defined in claim 2, wherein said housing has a circular cross-section.

4. A cable connector as defined in claim 1, wherein said gripping means comprises a pair of cable engaging tips formed uppermost on said upper portion.

5. A cable connector as defined in claim 4, wherein said housing has a circular cross-section.

6. A cable connector as defined in claim 1, wherein said housing has a circular cross-section.

7. A cable connector as defined in claim 1, wherein said housing and said flange are integrally formed from a resilient plastic material.

8. A cable connector as defined in claim 1, wherein:
   (a) said housing and said flange are integrally formed from a resilient plastic material; and,
   (b) said housing has an elongated cylindrical configuration with an elongated slot extending lengthwise and through the wall thereof to permit resilient radial compression of said housing.

9. A cable connector as defined in claim 1, wherein opposed points on opposed side edges of said flange move into contact abutment with said inner wall when said flange is forcibly bent forwardly more than a predetermined degree.

10. A cable connector as defined in claim 1, wherein said free end is positioned:
    (a) to rest away from said inner wall when said flange is not bent forwardly; and,
    (b) to move into bracing contact with said inner wall when said flange is forcibly bent forwardly more than a predetermined degree.

11. A cable connector as defined in claim 1, wherein said housing includes means for snappingly engaging the housing with a wall through which the housing is extended.

* * * * *